No. 690,335. Patented Dec. 31, 1901.
J. A. B. WESLEY.
NUT AND BOLT LOCK.
(Application filed Sept. 16, 1901.)

(No Model.)

Inventor,
John Albert Blackall Wesley,

Witnesses:

UNITED STATES PATENT OFFICE.

JOHN ALBERT BLACKALL WESLEY, OF GAWLER, SOUTH AUSTRALIA.

NUT AND BOLT LOCK.

SPECIFICATION forming part of Letters Patent No. 690,335, dated December 31, 1901.

Application filed September 16, 1901. Serial No. 75,653. (No model.)

*To all whom it may concern:*

Be it known that I, JOHN ALBERT BLACKALL WESLEY, engineer, a subject of the King of Great Britain, residing at Gawler, in the State of South Australia, in the Commonwealth of Australia, have invented an Improved Nut and Bolt Lock, of which the following is a specification.

My invention relates to the construction of an improved nut and bolt lock. It is more particularly intended for bolting the fish-plates to the rails in the permanent way of railways and tramways, but is applicable to all analogous uses where it is of importance that bolts shall be prevented from becoming loose or unscrewed and are subject to intermittent vibration or variations in the strain of their attachments. Its object is to secure the construction of a bolt which shall, in addition to its locking power as a bolt under tension, sufficiently combine the inherent character of a spring as to permit of its adapting itself to any alteration or variation of the tension after it is once fitted in position without working loose under the vibration caused by the passage of the rolling-stock or other cause.

The special feature of my invention consists in the construction of a bolt in the form or nature of a coiled, bent, or helical spring, while the expansion within the nut causes it to be locked and prevents the nut from working loose in actual work.

My improved bolt is formed from a strip of spring-steel or other suitable material of any desired section, preferably having a solid head on one end and a portion of the body screw-threaded in the ordinary way. On the screw-threaded portion is fitted a nut of any usual construction, or equivalent attachment. The bolt when put in position in the fish-joint is tensioned to such a degree that the coils open out and then expand or contract, according to the variation in the strain upon them from the load or other cause.

That the invention may be clearly understood I have appended hereto a sheet of illustrative drawings, in which—

Figure 1:
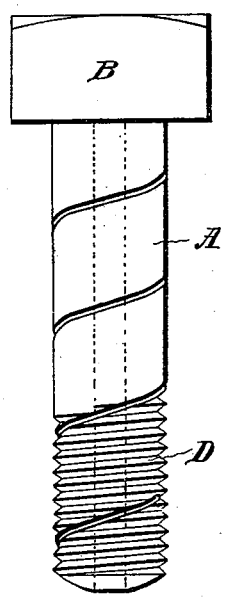
Figure 2:
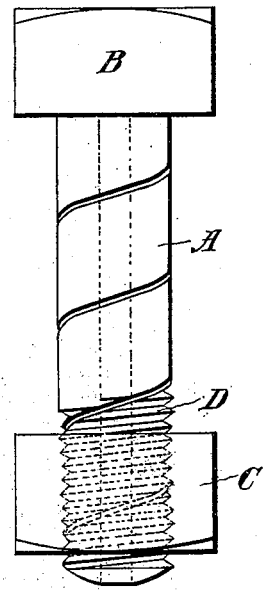
Figure 3:
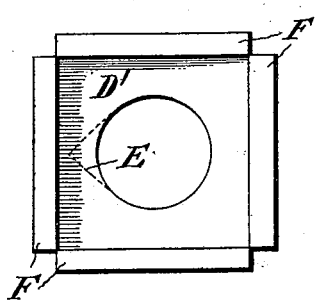
Figure 4:
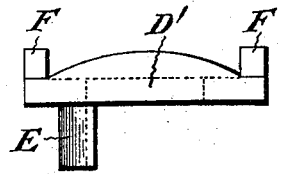

Figure 1 is a diagrammatical view of my improved bolt with the nut removed. Fig. 2 is a diagrammatical view of the bolt under tension; Figs. 3 and 4, detail views of washer applied to a fish-plate.

In the drawings, A represents the shank of the bolt, in the form of a coiled, bent, or helical spring, with a head B at one end and a loose nut C fitted on the screw-threaded portion D, which nut C when in use is so fitted under tension on the portion D as to hold between it and the head B the parts, such as the rail and fish-plates, to which the bolt is applied.

In conjunction with the nut C, I may use a washer D', having projections or lugs E to engage in corresponding recesses in the fish-plates, and lugs F on its other side to fit the squares of the nut, so as to form a fixed bearing for the nut when being secured in position.

In its normal locked position as applied to the fish-plates the bolt is in the form illustrated in Fig. 2. It is fitted in position under tension, the nut or other attachment being screwed on or affixed as may be required. The coils of the bolt are, however, more or less opened out when the bolt is screwed up in position and being so opened out and tensioned will readily adapt themselves by expansion or contraction to the variation in the strain of the rolling-stock with the variations in temperature or in the load.

The screw-threaded nut also forms a perfect lock-nut which it is practically impossible to work loose after being screwed up in position. The coils forming the body of the bolt expand within the nut and cause the threads to securely lock. The coils may be of any desired section, according to the size of bolt employed, and may be coiled either hand. The bolt itself may also be constructed and tempered in any well-known manner which will give the necessary elasticity.

What I claim, and desire to secure by Letters Patent of the United States, is—

1. A bolt having a shank formed of a coil-spring, the coils of the spring on one end of said shank threaded, substantially as described.

2. A bolt having a shank of uniform diameter and formed of a coil-spring, the coils of the spring at the end of the bolt threaded to receive a nut, substantially as described.

3. The combination with a bolt having a shank of uniform diameter formed of a coil-spring, the coils of the spring at the end of the shank threaded, and a nut, of a washer adapted to hold the sides of the nut and a lug on its rear face to engage a recess in the object clamped, substantially as described.

4. The combination with a bolt having a shank formed of a coil-spring, the coils of the spring at the end of the shank threaded and a suitable nut, of a washer having lugs F on one side thereof conforming to the outline of the nut and a lug on the opposite side adapted to take into a recess in the object clamped, substantially as described.

In testimony that I claim the foregoing as my invention I have signed my name in presence of two subscribing witnesses.

JOHN ALBERT BLACKALL WESLEY.

Witnesses:
CHARLES ANDREW MURPHY,
CHARLES STANLEY BURGESS.